No. 704,383. Patented July 8, 1902.
J. SCHEIDEMAN.
PROCESS OF PURIFYING REFRIGERANTS IN CIRCULATION IN REFRIGERATING PLANTS.
(Application filed Apr. 19, 1902.)
(No Model.)
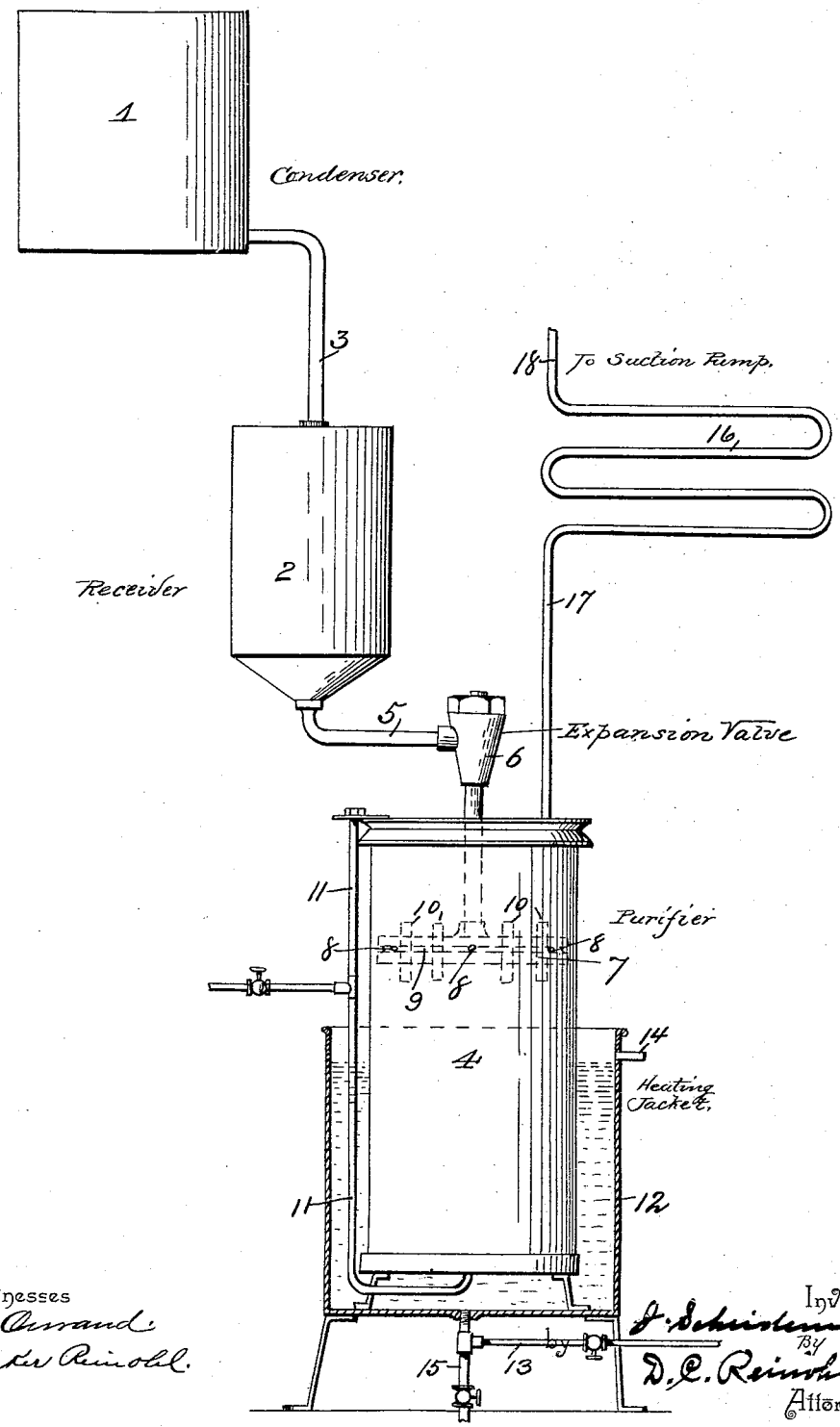
Witnesses
F. L. Ourand
W. Parker Reinohl
Inventor
J. Scheideman
By D. C. Reinohl
Attorney

UNITED STATES PATENT OFFICE.

JOHN SCHEIDEMAN, OF WASHINGTON, DISTRICT OF COLUMBIA.

PROCESS OF PURIFYING REFRIGERANTS IN CIRCULATION IN REFRIGERATING PLANTS.

SPECIFICATION forming part of Letters Patent No. 704,383, dated July 8, 1902.

Application filed April 19, 1902. Serial No. 103,723. (No specimens.)

*To all whom it may concern:*

Be it known that I, JOHN SCHEIDEMAN, a citizen of the United States, residing at Washington, in the District of Columbia, have invented certain new and useful Improvements in Processes of Purifying Refrigerants in Circulation in Refrigerating Plants; and I do hereby declare the following to be a full, clear, and exact description of the invention, such as will enable others skilled in the art to which it appertains to make and use the same.

My invention relates to the art of refrigeration as practiced in cold-storage or ice-making plants, in which ammonia or other volatile liquid under compression is used as a refrigerant, has for its object the purification of the refrigerant while in circulation through the system or plant, and consists in the processes which will be fully disclosed in the following specification and claims.

The accompanying drawing, which forms part of this specification, represents a diagrammatic view of the devices employed to carry out my invention.

Reference being had to the drawing and the numerals thereon, 1 indicates a condenser of any preferred form of construction; 2, a receiver for the liquid refrigerant the product of condensation and is connected to the condenser by a pipe 3; 4, a purifier connected to the receiver by a pipe 5, with an expansion-valve 6 interposed between the receiver and the purifier; 7, a liquid-distributing diaphragm or partition in the purifier, having lateral passages 8 and a peripheral discharge 9 for the liquid and passages 10 for the gas from the liquid-chamber below the diaphragm to the gas-chamber above the diaphragm; 11, a discharge-pipe for the impurities contained in the refrigerant; 12, a heating-jacket for the lower part of the purifier, supplied with steam or hot water and kept at a temperature of about 125° Fahrenheit through pipe 13; 14, an overflow-pipe; 15, a discharge-pipe for the water-jacket; 16, a refrigerating-coil forming part of a system and connected to the purifier by pipe 17 and is connected by pipe 18 to a suction-pump. (Not shown.) Liquid ammonia or other refrigerant the product of condensation flows from the condenser into the receiver, from whose lowest point the liquid, with all its impurities, flows into the purifier 4 by passing through expansion-valve 6, which vaporizes a portion of the refrigerant, and the liquid and the gas set free by the expansion-valve pass on down through the diaphragm 7, which breaks up the liquid and distributes it in fine streams, which fall from the peripheral diaphragm 9 in thin sheets. The major portion of this liquid is vaporized in its descent from the diaphragm by the heat in the purifier above the heating-jacket, while the impurities precipitate to the bottom of the liquid-chamber in the purifier. The higher degree of heat in the lower part of the liquid-chamber vaporizes the refrigerant contained in the impurities, and the vapors or gas thus produced rise and escape through passages 10 in the diaphragm 7, commingle with the gas the product of the previous vaporizations in the chamber above the diaphragm, and from said chamber the combined and commingled gases of the several steps of vaporization are returned through pipe 17 to coil 16 and thence to the suction-pump of the system and circulation of the refrigerant maintained throughout the system in repeated cycles and the refrigerant relieved of its impurities in each cycle of operation. The impurities which collect in the liquid-chamber of the purifier are removed periodically through pipe 11, and these impurities contain oil, weak liquor, scale from the pipes, and other contaminating matter, which weak liquor and oil frequently saponifies in the pipes or coils of the system under the present and prevailing practice of operation; but by freeing the anhydrous ammonia of its impurities this saponification is prevented, the pipes or coils kept clean, and the plant operated with better results, under lower pressure, and at a great saving of expense as compared with the present and prevailing system of operation.

Having thus fully described my invention, what I claim is—

1. The process of purifying a refrigerant in circulation in a refrigerating plant, which consists in collecting liquid refrigerant the product of condensation, vaporizing said liquid, then collecting the impurities from the refrigerant, vaporizing the refrigerant contained in said impurities, commingling the products of the several vaporizations and delivering these gases directly to the refrigerating-coils of the plant.

2. The process of purifying a refrigerant in circulation in a refrigerating plant, which consists in collecting liquid refrigerant the product of condensation, vaporizing said liquid, then collecting the impurities from the refrigerant, vaporizing the refrigerant contained in said impurities, commingling the products of the several vaporizations and delivering these gases directly to the refrigerating-coils of the plant, and removing the impurities.

In testimony whereof I affix my signature in presence of two witnesses.

JOHN SCHEIDEMAN.

Witnesses:
D. C. REINOHL,
W. PARKER REINOHL.